(12) United States Patent
Woodruff (10) Patent No.: US 8,627,980 B2
(45) Date of Patent: Jan. 14, 2014

(54) ENCLOSED BATHTUB LINER (76) Inventor: Tony Woodruff, Wausau, WI (US)

(*) Notice: Subject to any disclaimer, the term of this patent is extended or adjusted under 35 U.S.C. 154(b) by 1658 days.

(21) Appl. No.: 11/402,583

(22) Filed: Apr. 11, 2006

(65) Prior Publication Data

US 2007/0235454 A1    Oct. 11, 2007

(51) Int. Cl.
*B65D 25/14* (2006.01)
(52) U.S. Cl.
USPC ............ 220/495.03; 4/580; 220/495.06
(58) Field of Classification Search
USPC ............... 405/111; 4/580, 583–585
See application file for complete search history.

(56) References Cited

U.S. PATENT DOCUMENTS

| | | | |
|---|---|---|---|
| 3,750,196 A * | 8/1973 | Halferty | 4/625 |
| 3,931,651 A | 1/1976 | Weir | |
| 4,193,518 A | 3/1980 | Holmes | |
| 4,264,991 A | 5/1981 | Lasalandra | |
| 4,898,301 A * | 2/1990 | Schick | 229/117.27 |
| 5,037,002 A * | 8/1991 | Tschanen | 222/105 |
| 5,153,950 A | 10/1992 | Sowers | |
| 5,165,456 A * | 11/1992 | Woolman | 141/98 |
| 5,216,764 A | 6/1993 | Hall et al. | |
| 5,251,345 A | 10/1993 | Pechner | |
| 5,358,000 A * | 10/1994 | O'Hair | 137/124 |
| 5,402,909 A * | 4/1995 | Cramer et al. | 220/601 |
| 5,540,355 A | 7/1996 | Hancock | |
| 5,778,471 A | 7/1998 | Collison | |
| 5,862,544 A * | 1/1999 | Placencia | 4/597 |
| 5,967,197 A * | 10/1999 | Shown | 141/18 |
| 6,336,231 B1 | 1/2002 | Smith | |
| 6,390,154 B1 * | 5/2002 | Hall | 141/314 |
| 6,766,921 B2 * | 7/2004 | Keller | 222/95 |
| 2007/0199840 A1 | 8/2007 | Woods | |
| 2008/0000922 A1 | 1/2008 | Nevils et al. | |

OTHER PUBLICATIONS

International Search Report, co-pending appln. PCT/US2007/008776.

* cited by examiner

*Primary Examiner* — Tara M. Pinnock
(74) *Attorney, Agent, or Firm* — Casimir Jones, S.C.

(57) ABSTRACT

Systems and methods for collection and storage of potable water, in particular, disposable-food-grade liners and bladders for sanitary storage of water in a bathtub, and emergency preparedness kits comprising a disposable food grade bladder liner for collection and storage of water in a bathtub.

17 Claims, 11 Drawing Sheets

ENCLOSED BATHTUB LINER

FIELD OF THE INVENTION

The present invention relates to systems and methods for collection, storage, and dispensing of potable water. In particular, the present invention relates to bladder liners for sanitary storage of water in a bathtub, e.g. as a step in disaster preparedness. The present invention relates to kits for emergency preparedness comprising a food grade bladder liner for collection and storage of water in a bathtub.

BACKGROUND OF THE INVENTION

In preparing for emergency situations, e.g., caused by either man-made or natural disasters, provisions for an adequate supply of potable water are near the top the list of steps to be taken. A supply of drinking water is considered more important for survival than immediate access to food. The Department of Homeland Security offers guidelines for emergency preparedness, and these guidelines recommend a minimum emergency supply of water comprising one gallon per person, per day, with additional amounts needed for cooking and washing.

The storage of large volumes of water indefinitely can pose problems for many. Storage of tens of gallons of water requires a substantial amount of space. Storage in small containers (e.g., one or two gallon containers, as are commonly available, e.g., in groceries) can require a large number of containers to supply, e.g., an entire family through several days or weeks following a disaster. Larger volume storage, e.g., in typical fifty-five gallon drums, is similarly inconvenient for many householders. A filled fifty-five gallon drum weighs over about 440 pounds and is not easily moveable once filled. Thus, a drum requires dedicated floor space that is structurally capable of holding such weight, and that is close to a water source, e.g., a faucet, for filling. These space considerations alone can make it difficult or impossible for many people to store the recommended amounts of water. Many people lack the space in their homes to keep a large number of these small containers or to keep a 55-gallon drum on hand. In addition to the space concerns, the long-term storage of drinking water can also pose safety concerns if the water is not properly purified upon storage, if the container used is contaminated by a prior use, or if the water is left to stand for years on end.

For these and other reasons, many people do not elect to store the amounts of water recommended for disaster preparedness. Rather, when disaster occurs or is imminent, water, generally from a household tap, is often stored in whatever containers are on hand. Most readily available vessels (e.g., drinking bottles, food storage jars) can contain only a fraction of the amount of water recommended. Thus, there is a need for improved devices for storing potable water.

The largest, strongest vessel readily available to many people is a bathtub. A typical residential bathtub will hold between about 50 and 90 gallons of water, and some will hold substantially more. Storing drinking water directly in a bathtub is not recommended, however, as residue in a bathtub, both from normal use and from cleaning, is likely to cause both microbial and chemical contamination of water stored directly in the tub, making it unsuitable for consumption or food preparation. Use of a bathtub for containing potable water requires a barrier to prevent contact between the water and the bathtub surface.

SUMMARY OF THE INVENTION

The present invention provides a bladder liner configured be contained in and supported by a bathtub, e.g., to be readily filled by a bathtub faucet. In preferred embodiments, the bladder liner comprises food-grade construction materials. In particularly preferred embodiments, the bladder liner is disposable.

In some embodiments, the present invention provides a system comprising a food-grade bladder liner comprising at least one aperture, and a filling hose comprising a universal adaptor. In some embodiments, the body of the food-grade bladder liner comprises a plastic film of about 1 to 20 mils in thickness. In some preferred embodiments, the plastic film is about 2 to 10 mils in thickness. In particularly preferred embodiments, the plastic film is about 4 to 8 mils in thickness.

In some embodiments, the system of the present invention comprises a dispenser. In some preferred embodiments, the dispenser comprises a pump. In some particularly preferred embodiments, the dispenser comprises a siphon pump assembly. In some embodiments, the dispenser comprises a collar, e.g., for attachment of the dispenser to an aperture of a bladder liner.

In some embodiments, the system of the present invention comprises a cap, e.g., for reversibly sealing an aperture of a bladder liner.

In some embodiments, the present invention provides a kit, e.g., for emergency or disaster preparedness. In preferred embodiments, the kit is a packaged kit. In some embodiments, the kit of the present invention comprises a bladder liner and a filling hose comprising a universal adaptor. In preferred embodiments, the bladder liner is food-grade. In some embodiments, the body of the bladder liner comprises a plastic film of about 1 to 20 mils in thickness. In some preferred embodiments, the plastic film is about 2 to 10 mils in thickness. In particularly preferred embodiments, the plastic film is about 4 to 8 mils in thickness.

In some embodiments, the kit of the present invention comprises a dispenser. In some preferred embodiments, the dispenser comprises a pump. In some particularly preferred embodiments, the dispenser comprises a siphon pump assembly. In some embodiments, the dispenser comprises a collar, e.g., for attachment of the dispenser to an aperture of a bladder liner.

In some embodiments, the kit of the present invention comprises a cap, e.g., for reversibly sealing an aperture of a bladder liner.

In some embodiments, the present invention provides a method of collecting potable water, comprising lining a bathtub with a bladder liner and filling the bladder liner with water. In some embodiments of the method of the present invention, the bladder liner has a storage volume of at least 50 gallons. In some embodiments of the method of the present invention the bladder liner has a storage volume of at least 75 gallons.

DEFINITIONS

The term "bladder liner" as used herein refers to a liner for a bathtub configured to provide a barrier between the bathtub surface and liquid contained in the bathtub. The bladder liner is further configured to enclose the liquid contained, e.g., to prevent contamination from falling debris or other matter, and to provide access to the liquid contained in the bladder through one or more apertures.

As used herein, the term "body" as applied to a bladder liner of the present invention refers to a component of the bladder that encloses the liquid contained in the bathtub, but does not include fittings at the aperture(s) (e.g., threaded fittings), or any attached devices for filling or dispensing.

The term "universal adaptor" as used herein in reference to a filling hose, refers to an adaptor for directing water from bathtub faucet spout into a filling hose (e.g., filling hose 4), wherein the adaptor is configured to be compatible with many different spout types. In some embodiments, the universal adaptor is configured to attach to a faucet spout. In some embodiments, a universal adaptor comprises a sleeve that can be cinched, e.g., by hand or with a hose clamp, to provide connection to a variety of types of faucet spouts. In preferred embodiments, the universal adaptor of the present invention comprises a flexible sleeve, e.g., of rubber or silicone, that stretches to accommodate and seal around many different faucet spout types and sizes. In particularly preferred embodiments, the universal adaptor is configured to provide a substantially water-tight seal when attached to a faucet spout.

The term "food-grade" as used herein refers to materials that have been recognized by the U.S. Food and Drug Administration as suitable for use in applications in which the materials will be in direct contact with food or liquid intended for human consumption.

The term "dispenser" as used herein refers to an assembly configured to dispense liquid contained in a bladder liner.

The term "siphon pump assembly" as used herein refers to a dispenser comprising tubing for siphoning liquid and a pump configured to propel liquid through the tubing to start a siphon flow. In some embodiments, a siphon pump assembly comprises an inlet hose and an outlet tube.

The term "kit" as used herein refers to a collection of articles for use for a particular purpose. In some embodiments, the articles comprise instructions for use, e.g., as information supplied on an article, on paper, or on recordable media (e.g., diskette, CD, etc.).

The term "packaged kit" as used herein refers to a kit that is packed or packaged, e.g., in a container such as a bag, box, pouch, etc., for convenient distribution to a recipient, e.g., through retail sales, or through emergency preparedness or emergency relief agencies.

The term "system" as used herein refers to a collection of articles for use together for a particular purpose.

The term "storage capacity" as used herein refers to a volume of liquid that can be contained in a bladder liner.

DESCRIPTION OF THE INVENTION

The present invention provides systems, kits, and methods for convenient and sanitary storage of water, e.g., for emergency use. In particular, the present invention provides a waterproof liner sized to be accommodated by a bathtub, e.g., a residential bathtub, and configured to contain water in the bathtub so as to limit or prevent contact of the stored water with the surface of the bathtub. In preferred embodiments, the liner comprises a bladder configuration, such that the water is enclosed in the liner.

Existing bathtub liners have generally been disposed in bathtubs to permit ease of maintenance of the bathtub, or to provide a comfortable bathing setting. For example, a removable bathtub liner is exemplified in U.S. Pat. Nos. 3,931,651 to Weir and 5,153,950 to Sowers, wherein a liner is removably mounted in contact with a top surface of an associated bathtub. U.S. Pat. No. 5,216,764 to Hall et al. teaches a bathtub and shower liner ensemble formed of thin, disposable, sterile, plastic film sheers, with a bottom mat-like sheet secured to the bathtub or shower basin to provide cushion and comfort. The entire liner assembly is compressed to form a single, thin, flexible lining, which is removed through the process of peeling, where the thin film sheers are individually peeled from the top. Each new film sheer provides a new sterile surface. In some instances, a bathtub liner is used for protection of the bath user from injury or discomfort from the surface of the tub. For example, U.S. Pat. No. 6,336,231 to Smith teaches an inflatable liner for use with conventional bathtubs. The inflatable liner is for use with infants, elderly, physically disable or other instances where a cushioned and/or sanitary bathing surface is desired. However, none of these bathtub liners are configured for the sanitary storage of potable water.

Collapsible containers and bladders for storing liquids are known in the art. For example, the "bag in a box" configuration uses a box-shaped support, typically of corrugated cardboard, and a collapsible bag disposed therein for containing liquid. Generally, liquid is dispensed via a spigot positioned low on the box to draw liquid from the bottom of the container. In some configurations, the box is configured to act as a pitcher, to allow liquid to be poured from the top. Bag-in-box containers are generally configured for factory-based filling (e.g., for packaging of beverages such as wine in a box) and are not configured for at-home filling, e.g., from a faucet spout. Further, bag-in-box containers for home use are generally configured to hold relatively small volumes, e.g., 1- to 5 gallons. A bag-in-box system for large volume storage, even when empty, require a substantial amount of storage space and, to a residential user, presents many of the same problems with storing, filling, moving and using when full.

A similar device is a semi-rigid collapsible container, such as the Cubetainer® container. The Cubetainer® container is generally roughly cubic or rectilinear when full but, when empty, is collapsable along a diagonal so that one half of the cube fits within the other half. The collapsed containers take up less space, and a plurality of empty containers can be stacked together. The plastic is semi-rigid such that the container can assume and maintain its cubic shape when empty (i.e., it does not rely on the pressure of liquid inside to take its shape). Generally, such collapsible containers are limited to about 5 gallons capacity, so a number of such containers would be required for large-volume (e.g., 50 to 100 gallons) water storage.

Bladder, or "pillow" tanks, often made of plastic or rubber, for large-volume storage of liquids (e.g., 100 gallons to 50,000 gallons) are known. Pillow tanks generally have a single seam binding two sheets of plastic or rubber so that, when filled with water, the tank assumes the shape of a pillow. Pillow tanks are generally used on a flat surface such as the ground, a slab such as a concrete slab, or on a support that is sturdy enough to support the weight of the liquid contained, such as the bed of a truck. A pillow tank generally does not use an external structural support (e.g., a support box) and the plastic and seams of even the smallest pillow tank are thus required to be of sufficient weight and strength to contain hundreds pounds of liquid. Consequently, pillow tanks in the 100 gallon capacity range generally weigh 50 to 100 lbs when completely empty, making them prohibitively bulky and difficult to handle for in-home water storage. In addition, the configuration of these tanks for use on a flat surface makes use indoors, e.g., inside a home, impractical, as they require an available floor surface in close proximity to a water source for filling. Still further, the requirements of the construction in order make the tanks free-standing (e.g., the use of plastic or rubber of sufficient thickness to support the weight of the contained liquid, the number and type of seam welds, etc.) make current pillow tanks prohibitively expensive to keep on hand for household emergency preparedness.

There remains a need for an inexpensive, food-grade, large-volume, collapsible storage bladder configured be contained in and supported by a bathtub, and to be readily filled by a bathtub faucet spout.

While the present invention will be described with reference to several specific embodiments, the description and drawings are illustrative of the present invention and are not to be construed as limiting the invention. Various modifications to the present invention can be made without departing from the scope and spirit of the present invention.

The present invention provides a waterproof liner sized to be accommodated by a bathtub, e.g., a residential bathtub, and configured to contain water in the bathtub so as to limit or prevent contact of the stored water with the surface of the bathtub. In preferred embodiments, the liner comprises a bladder configuration, such that the water is enclosed in the liner. Examples of bladder liners of the present invention are diagrammed, e.g., in FIGS. 1-3B. In preferred embodiments, the body of bladder liner 1 is constructed of thin, flexible material such as plastic film or plastic sheeting. The terms "film" and "sheeting" are used herein interchangeably to refer to thin, flexible sheets of material. In preferred embodiments, the plastic is food-grade plastic. Food-grade plastic films, such as polypropylene and polyethylene films, find use in the invention. In some embodiments the plastic film comprises a high-density polymer, while in some embodiments, the plastic film comprises a low-density polymer. In some embodiments, the bladder liner of the present invention comprises a plurality of different types of plastic film. In some embodiments, the plastic is anti-static.

In some embodiments, the plastic sheeting has sufficient strength that the bag can be moved small amounts (e.g. to repositioned in a bathtub, to remove wrinkles or otherwise improve filling) when the bag is partially filled. It is contemplated that the bladder liner is constructed of plastic film that is thin enough to be folded, e.g., for storage or packaging. In some embodiments, the body of the bladder liner comprises plastic film that is from about 1 to 20 mils (i.e., 1 to 20 thousandths of an inch) in thickness, although greater and lesser thicknesses may be used. In preferred embodiments, the body of the bladder liner comprises plastic film that is from about 2 to 10 mils thick. In particularly preferred embodiments, the body of the bladder liner comprises plastic film that is about 4 to 8 mils in thickness. In preferred embodiments, the bladder liner of the present invention is disposable. It is contemplated that, when a bladder liner in use is no longer needed (e.g., when water service is restored after an emergency), the bladder liner may be punctured or cut to release remaining water contained therein into the bathtub, and the destroyed liner may be removed and discarded.

In some embodiments, the bladder liner of the present invention comprises a seam. In preferred embodiments, the seam is a welded seam. In some embodiments, the bladder liner of the present invention comprises a single continuous seam adjoining a top plastic sheet and a bottom plastic sheet. In other embodiments, the bladder liner comprises two seams that seal the ends of a section of plastic film that is formed as a tube. In some embodiments, the bladder liner comprises a plurality of seams configured to provide a defined form, e.g., a box-shape, to the liner when it is in use. In preferred embodiments, seams are formed by heat-sealing or thermal welding.

Figure 1:
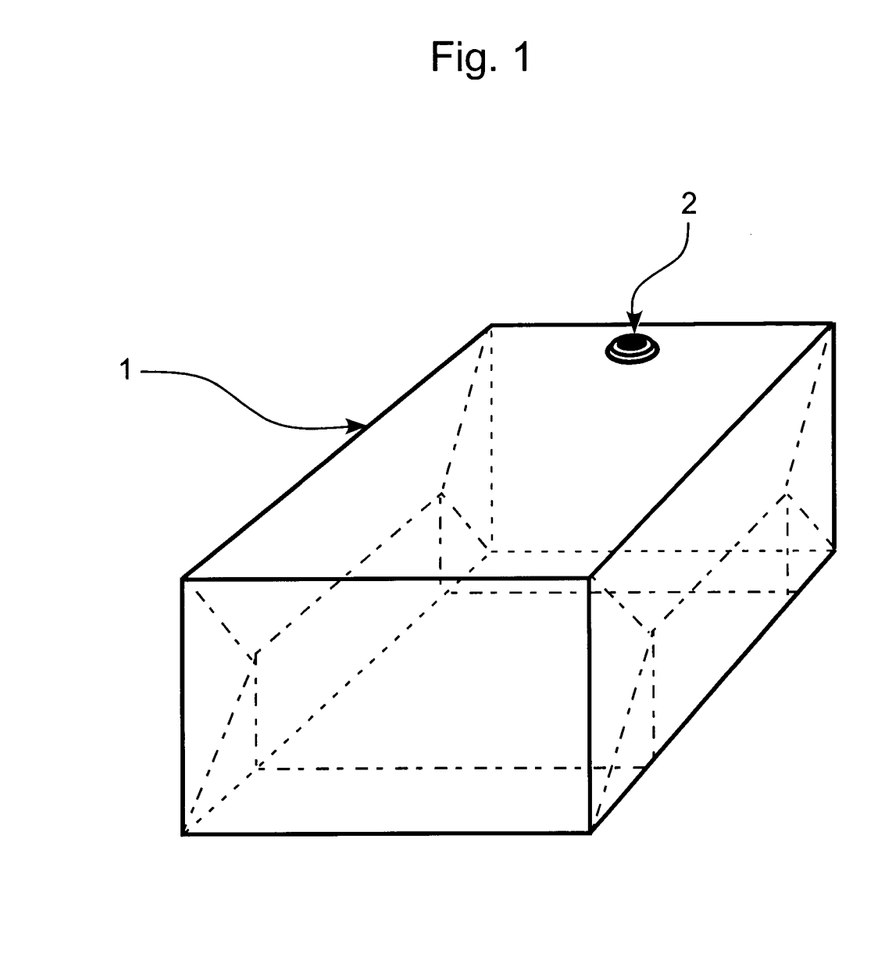
FIG. 1 provides a schematic diagram of one embodiment of a bladder liner of the present invention, showing bladder liner 1 comprising an aperture 2 for use in filling and dispensing.

In some embodiments, the bladder comprises a flexible box construction. In preferred embodiments, a box is constructed such that it can be collapsed along various creased lines, e.g., in the fashion of a paper grocery sack. FIG. 1 provides one embodiment of a box-constructed bladder liner.

Figure 2A:
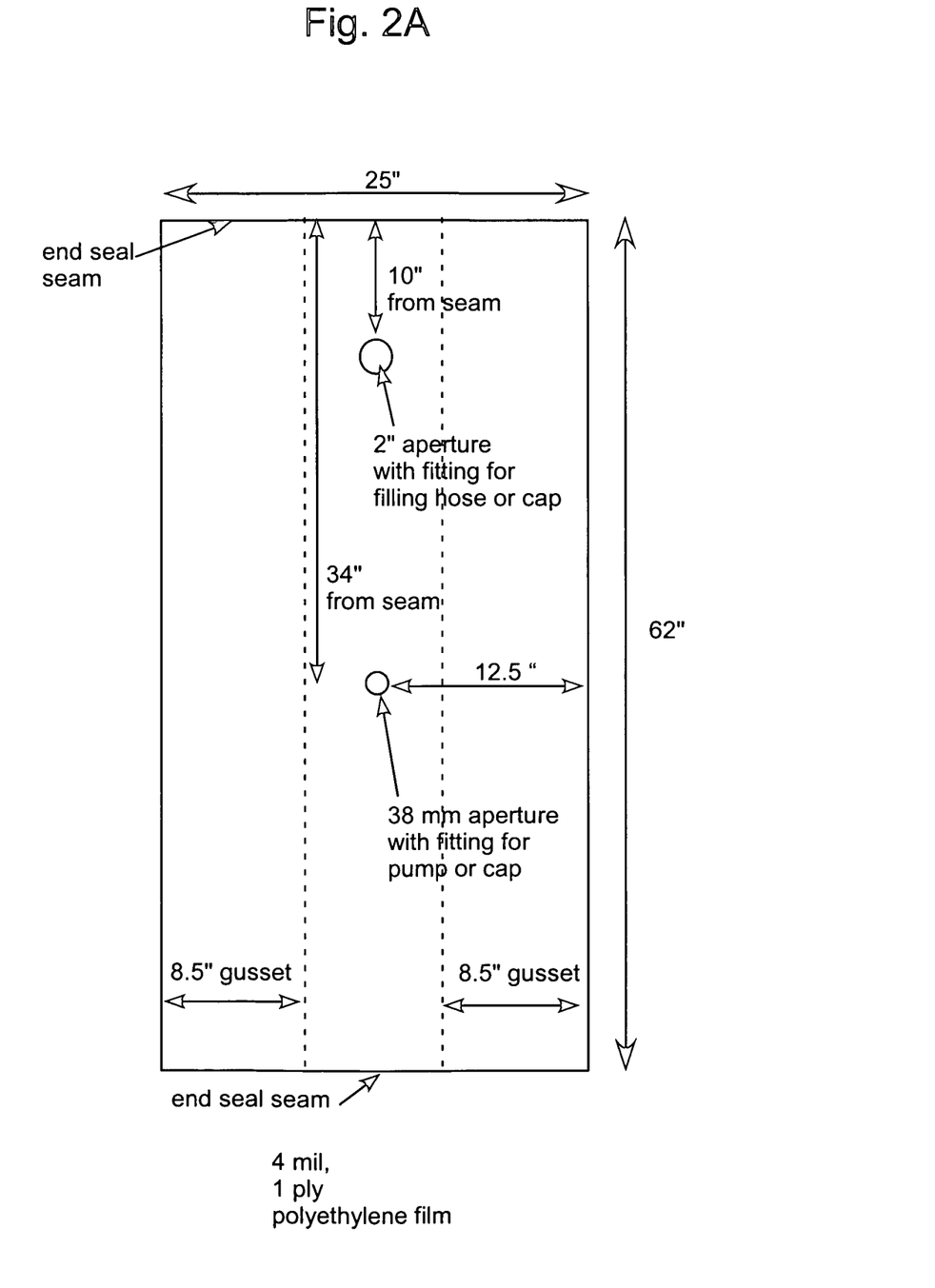
FIG. 2A provides one embodiment of a plan for forming a gusseted bladder liner from flat or tubular plastic film.
Figure 2B:
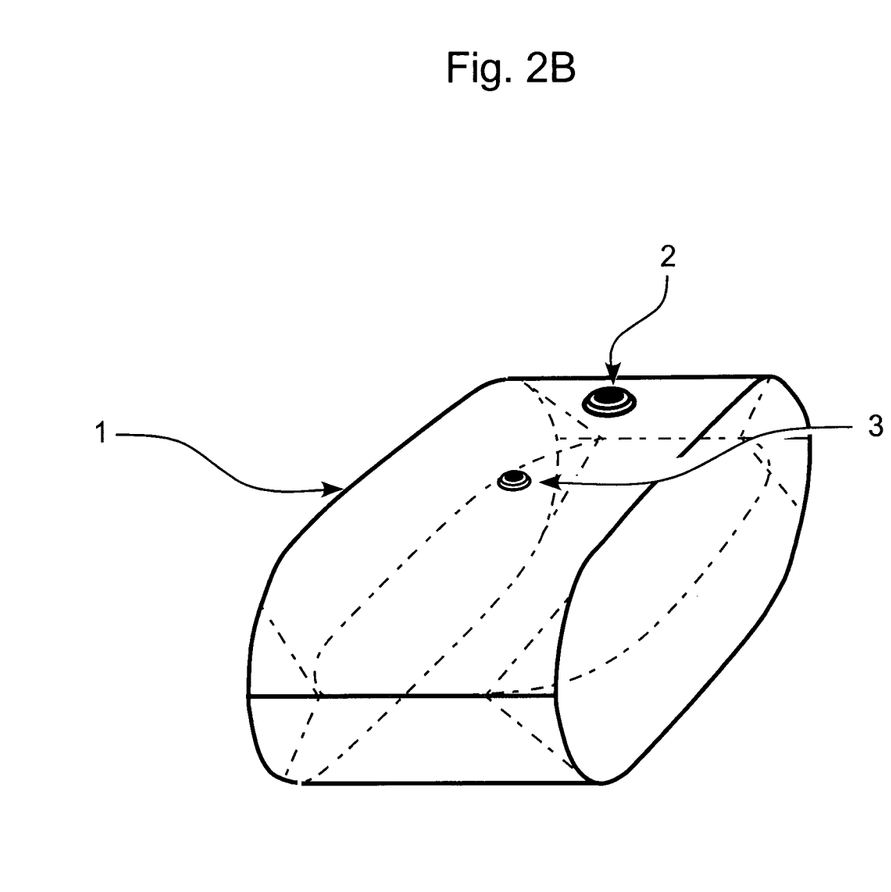
FIG. 2B provides a schematic diagram of one embodiment of a bladder liner of the present invention, showing bladder liner 1 comprising an aperture 2 for use in filling and dispensing.
Figure 3A:
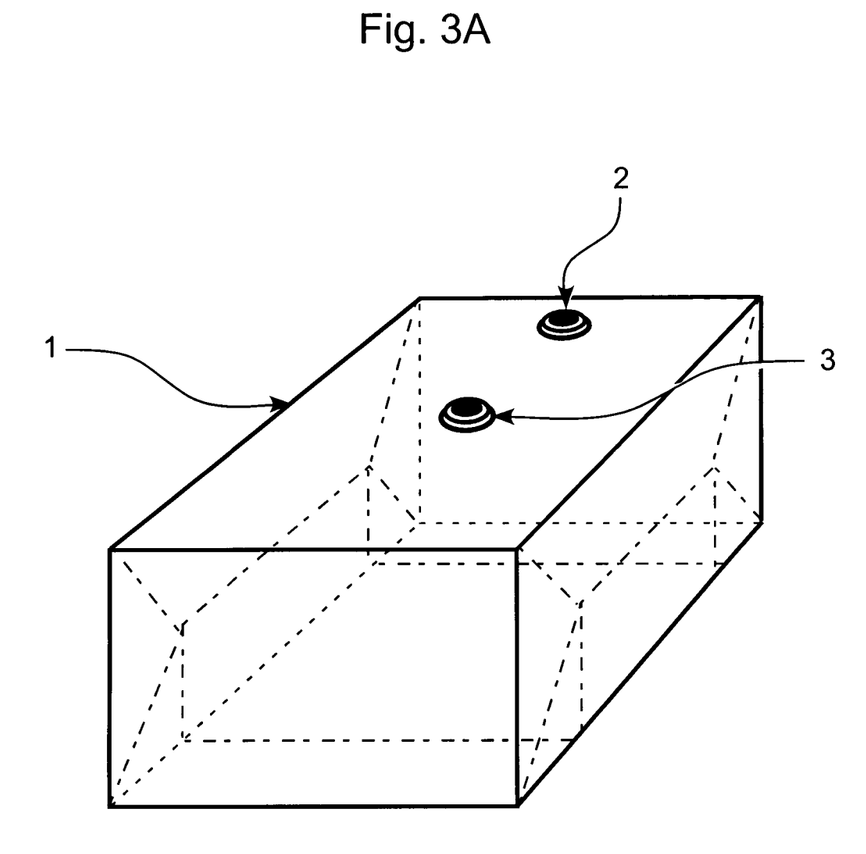
FIGS. 3A and 3B provide a schematic diagrams of embodiments of bladder liners of the present invention, each showing bladder liner 1 comprising an aperture 2 for filling and an outlet aperture 3 for dispensing.
Figure 3B:
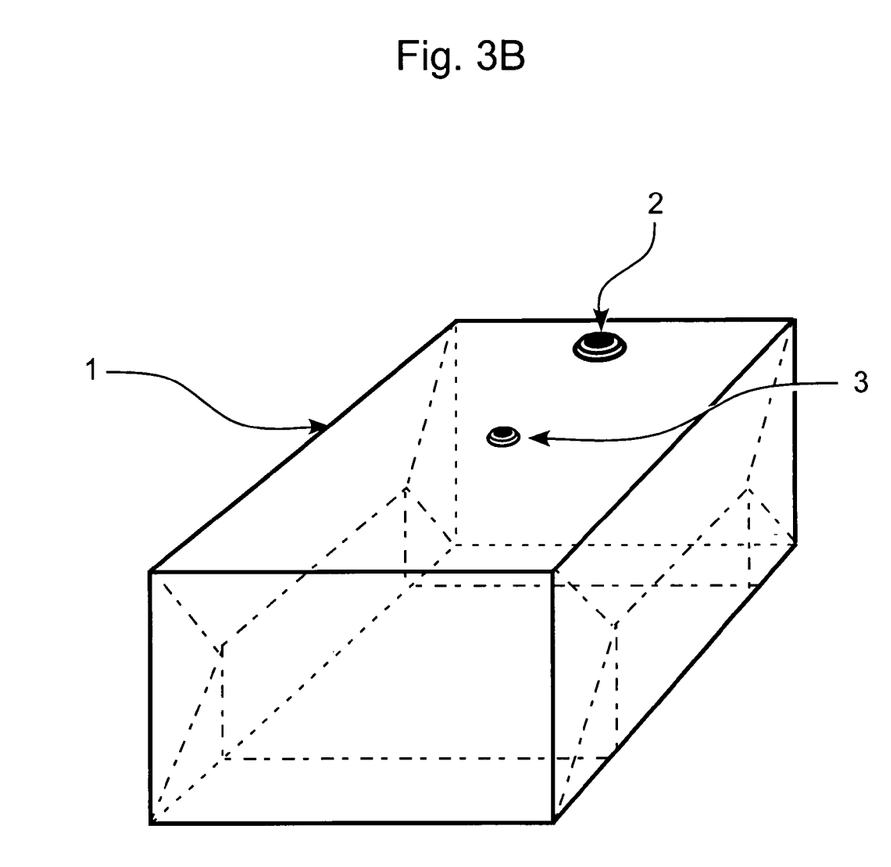

In some embodiments, the bladder liner is gusseted, e.g., to facilitate expanding and collapsing. FIG. 2A shows one embodiment of a plan for forming a gusseted bladder liner from flat or tubular plastic film. If tubular film is used, the gussets may be formed by folding, with each end anchored and sealed using a single seam. FIG. 2B provides a schematic rendering of an embodiment of a gusseted bladder liner that is expanded (as it would be, e.g., upon filling).

In some embodiments, one or more sides of the bladder liner is configured to reduce or alter transmission of light to water within the bladder liner, e.g., to reduce the growth of microbes such as algae. For example, in some embodiments, one or more sides of the bladder liner are constructed of material that is opaque and/or dark in color (e.g., black, brown, dark blue, purple, etc.).

In some embodiments, the bladder liner is configured to conform to a pre-existing bathtub. It is contemplated that, as configured in kits such as for emergency preparedness, the bladder liners can be configured to fit a range of standard sizes of bathtubs. However, the invention is not limited to bladder liners configured to match particular sizes of bathtubs. It is contemplated that in some embodiments, the bladder liner is configured to be oversized (e.g., generously sized compared to a standard bathtub) such that a single size of bladder liner can be used with bathtubs of a variety of sizes. In preferred embodiments, an oversized bathtub liner is constructed of particularly thin and pliable plastic film, e.g., less than about 4 mils thickness, such that excess plastic material (e.g., at the ends or in the corners of a smaller bathtub) will be maximally compressible and will not significantly reduce the volume of water that can be contained by and delivered from the bladder liner.

The bladder line of the present invention comprises one or more apertures for filling and for dispensing the liquid (e.g., water) contained therein. In some embodiments, the bladder liner comprises a single aperture that is used for both filling and dispensing. FIG. 1 provides a diagram of one embodiment comprising a single aperture 2. In embodiments comprising a single aperture, it is contemplated that the aperture is first used for filling the bladder container, e.g., with a filling hose 4, as diagrammed, e.g., in FIGS. 4A-C. After filling, the aperture 2 is use for dispensing the contained liquid, e.g. using a siphon pump assembly 6, as diagrammed in FIG. 6. In some embodiments, the apertures comprise fittings, e.g., threaded fittings, for attachment of the bladder to a filling hose 4 and/or a siphon pump assembly 6. In some embodiments, the fitting provides sealed attachment to the filling hose 4 and/or the siphon pump assembly 6. In particularly preferred embodiments, a single fitting is configured to provide sealed attachment to the both a filling hose 4 a siphon pump assembly 6.

In some embodiments, the bladder liner comprises multiple apertures. In some embodiments, the bladder liner comprises a single aperture for filling and dispensing, and comprises a separate aperture for venting, e.g., for allowing any trapped air to escape as the bladder is filled and/or to allow air to be drawn in so as to facilitate dispensing (e.g., to avoid the creation of negative pressure in the bladder during dispensing).

In some embodiments, separate apertures are provided for filling and dispensing. FIGS. 2A-B and 3A-B provide schematic views of several embodiments of bladder liners comprising multiple apertures (shown as apertures 2 and 3). In some embodiments, the apertures comprise fittings, e.g., threaded fittings, for attachment of the bladder to a filling hose 4 and/or a siphon pump assembly 6. In preferred embodiments, the fittings provide sealed attachment to the filling hose 4 and/or the siphon pump assembly 6. In particularly preferred embodiments, a single type of fitting is configured to provide sealed attachment to the both a filling hose 4 and/or to a siphon pump assembly 6. In some embodiments, the same type of fitting is used for both apertures, e.g., as diagrammed in FIG. 3A. In other embodiments, one aperture comprises a fitting for attachment of a filling hose 4 and another aperture comprises a fitting for attachment of a dispenser such as a siphon pump assembly 6.

Figure 4A:
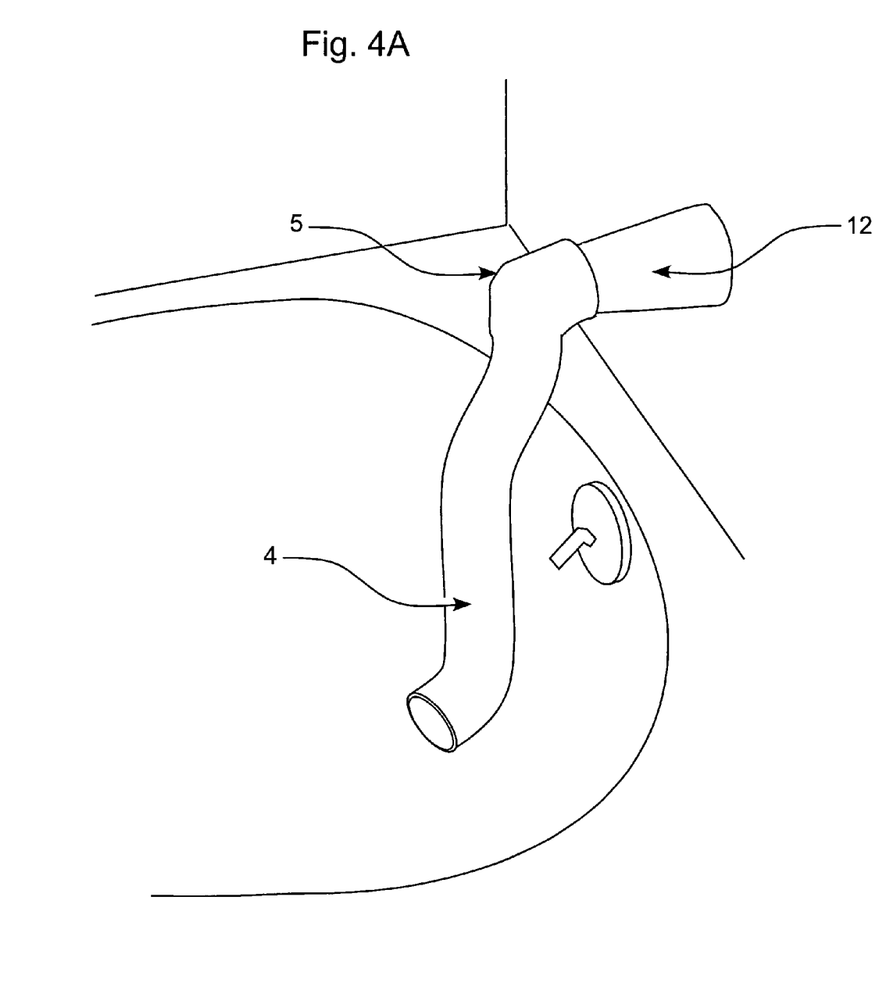
FIGS. 4A-4C provides schematic diagrams of various embodiments of a filling hose 4 comprising a universal adaptor 5 for attachment to bathtub faucet spout.
Figure 4B:
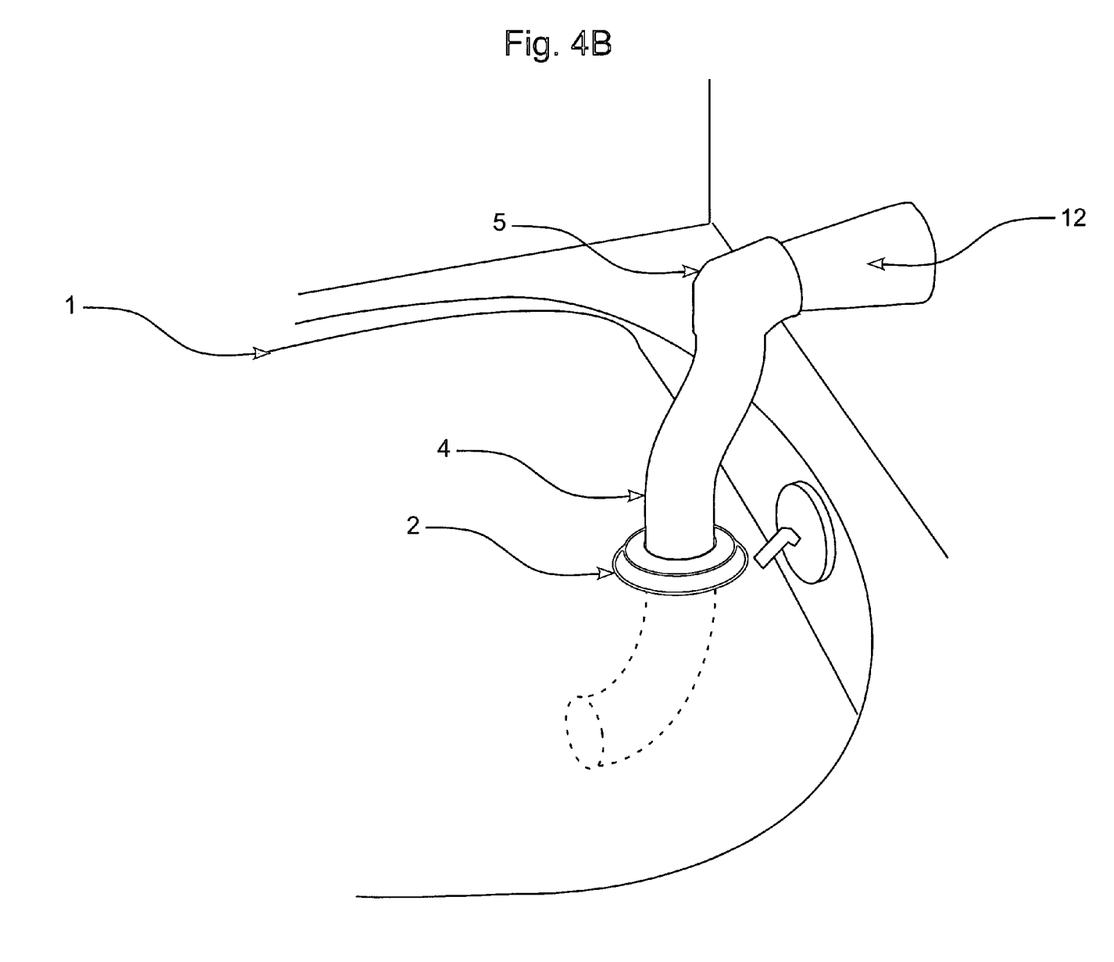

In preferred embodiments, the aperture for filling is large enough to accommodate flow of water from a bath faucet without restricting or impeding the flow, e.g., for rapid filling of the bladder liner. FIG. 4B provides a schematic diagram of an embodiment in which an aperture 2 is similar in diameter to the faucet spout 12. In some embodiments, the aperture is larger in effective diameter than a bathtub faucet spout, while in other embodiments, aperture 2 is smaller in effective diameter than a bathtub spout. As used herein, the term "effective diameter" refers to the size of the opening in bathtub faucet or the opening provided by the aperture in the bladder liner, e.g., the geometric area of aperture, the geometric area of the opening of the faucet spout, or, if the spout is wider at the opening than at other portions, the cross-sectional area of the narrowest passage in the faucet spout.

In some embodiments the bladder liner is part of a system for water collection. In some embodiments, the water collection system comprises a bladder liner and a filling hose. In preferred embodiments, the system further comprises a dispenser such as a siphon pump assembly 6. In some embodiments, the system further comprises one or more caps configured to reversibly seal (e.g., through a threaded fitting) one or more apertures of a bladder liner.

Figure 4C:
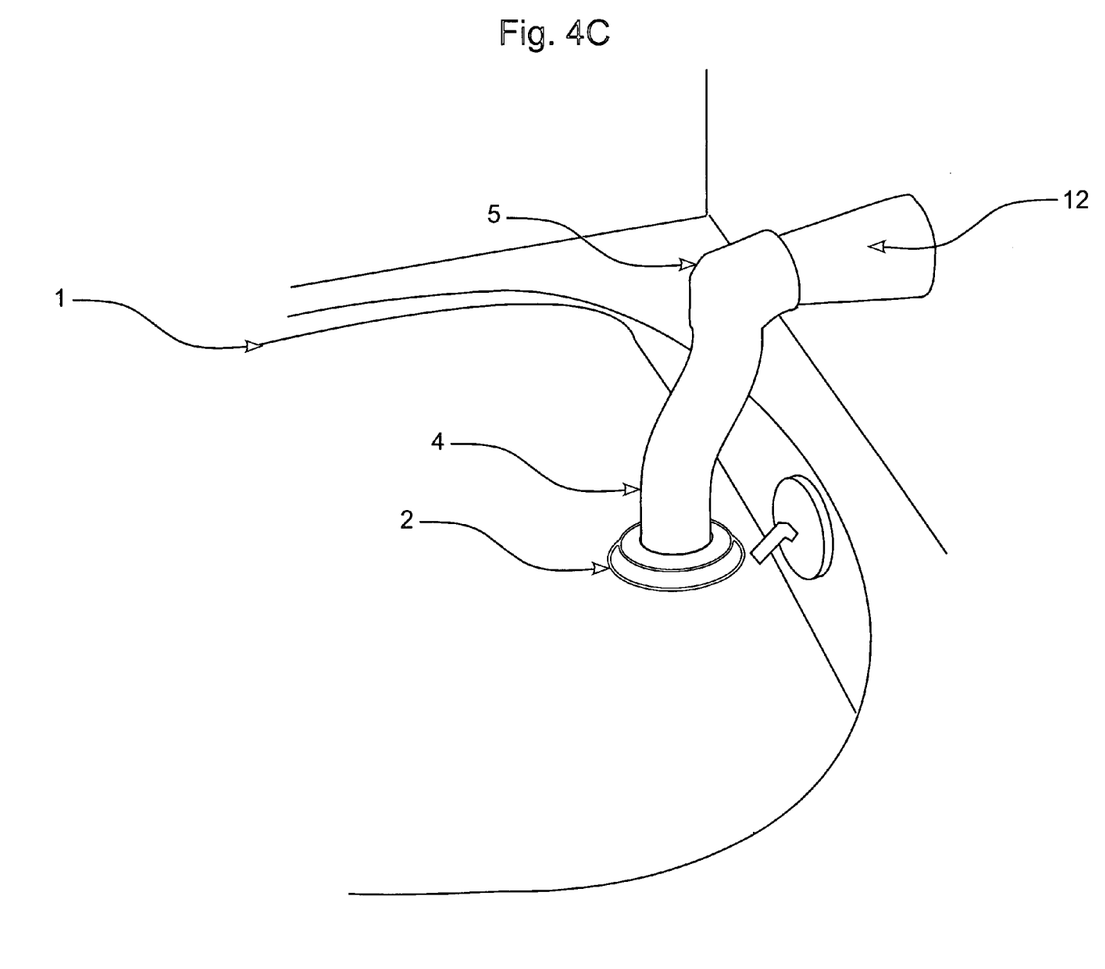

In some embodiments, the filling hose 4 comprises an adaptor for attachment of the hose to a bathtub faucet spout 12. In preferred embodiments, the filling hose 4 comprises a universal adaptor (e.g., a universal adaptor 5) for attachment to a bathtub faucet spout 12. In particularly preferred embodiments, a universal adaptor is configured to be able to attach to a variety of faucet spouts. In some embodiments, the universal adaptor comprises a flexible sleeve that snuggly fits over a faucet spout. In preferred embodiments, the universal adapter comprises an elastic material that can be stretched to accommodate different shapes and sizes of spouts. In particularly preferred embodiments, the universal adaptor comprises a natural or synthetic (e.g., silicone) rubber sleeve configured attach to a variety of faucet spout sizes and shapes. FIG. 4A-C show schematic representations of a sleeve-type universal adaptor 5 attached to a faucet spout 12.

In some embodiments, the universal adaptor is configured to loosely accommodate a faucet spout. In some embodiments, the loosely fitted universal adaptor is configured to be held in place on the faucet spout by hand during operation. In other embodiments, a loosely fitted universal adaptor of a filling hose is configured to be held in place by a device such as a clamp. In preferred embodiments, the clamp comprises a hose clamp.

In some embodiments, a filling hose is configured to end at the point at which it attaches to the bladder liner at an aperture (e.g., aperture 2; see, e.g., FIG. 4C). In other embodiments, the filling hose is configured to pass through an aperture into the interior of the bladder liner (see. e.g., FIG. 4B). Some embodiments the filling hose is configured to pass through an aperture into the interior of the bladder liner, and to attach to the bladder liner at the aperture. In some embodiments, the filling hose comprises a fitting for attachment of the filling hose to an aperture in the bladder liner. In preferred embodiments, a fitting for attachment of the filling hose to an aperture in the bladder liner comprises a swivel fitting that is rotatable with respect to the filling hose, e.g., such that the fitting can be rotated (for example, to engage a threaded attachment) without significantly rotating the filling hose. In preferred embodiments, a filling hose passes through a swivel fitting configured for attachment to an aperture in the bladder liner.

In some embodiments, the present invention provides a system comprising a bladder liner as described above and a dispenser, e.g., for dispensing liquid contained in the bladder liner. In preferred embodiments, the dispenser comprises a pump. The pump is not limited to any particular kind of pump, and suitable pumps for use in the system of the present invention include but are not limited to siphon pumps, piston pumps, lever pumps, and plunger pumps. In some preferred embodiments, the pump is a siphon pump. In particularly preferred embodiments, the pump of the present invention is configured for one-hand operation.

Figure 5:
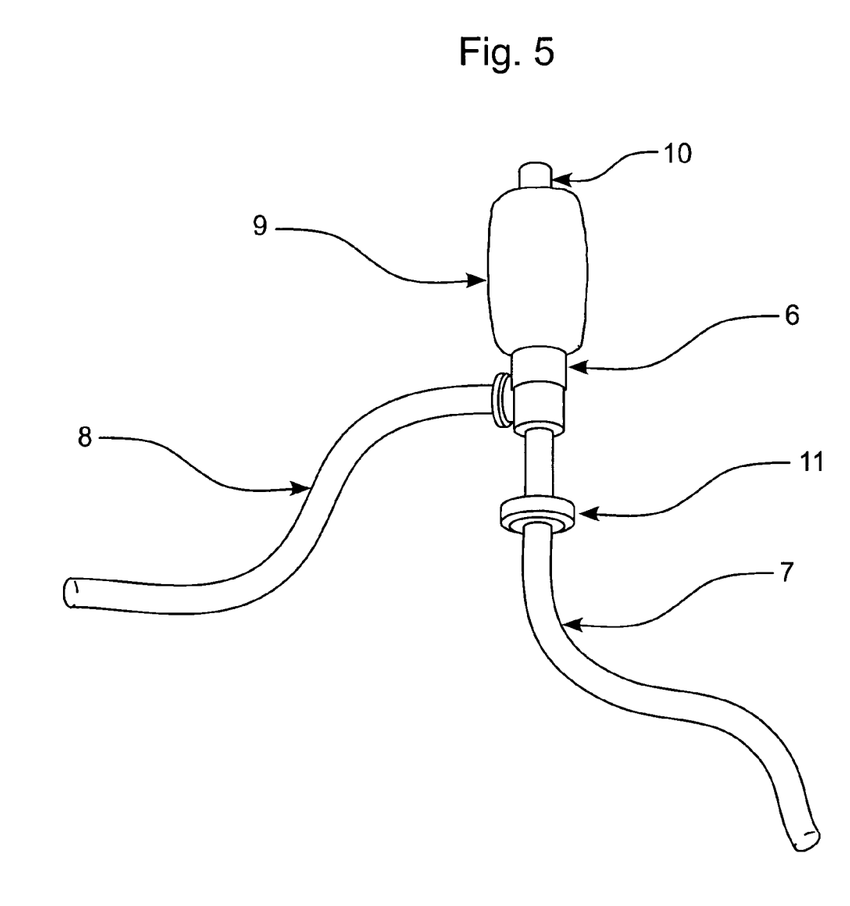
FIG. 5 provides a schematic diagram of one embodiment of a siphon pump assembly 6, comprising an intake hose 7 and an outlet tube 6, for use with the bladder liner 1.

FIG. 5 provides a schematic diagram of one embodiment of a siphon pump assembly 6 suitable for use in the system of the present invention. As shown in FIG. 5, in some embodiments, a siphon pump assembly 6 comprises an intake hose 7 for drawing water from the interior of the bladder liner, and an output tube 8 for dispensing water. In preferred embodiments, the intake hose and/or the output tube comprise flexible corrugated plastic tubing. The siphon pump assembly 6 further comprises a pump bulb to propel water through the intake and output tubes. In preferred embodiments, a pump assembly is configured for unidirectional flow, so as to draw water from the interior of the bladder liner into the intake hose, and to propel water out through the output tube. In particularly preferred embodiments, the siphon pump assembly is configured to move a sufficient amount of water to start a siphon action, after which water will move into the intake hose and out through the output tube so long as the siphon action is maintained. In preferred embodiments, the siphon pump assembly further comprises a release valve 10 to break the siphon action, e.g., to stop the flow of water. In particularly preferred embodiments, the release valve is operable by the same hand operating the pump bulb, such that the entirety of the pumping control is a one-hand operation.

Figure 6:
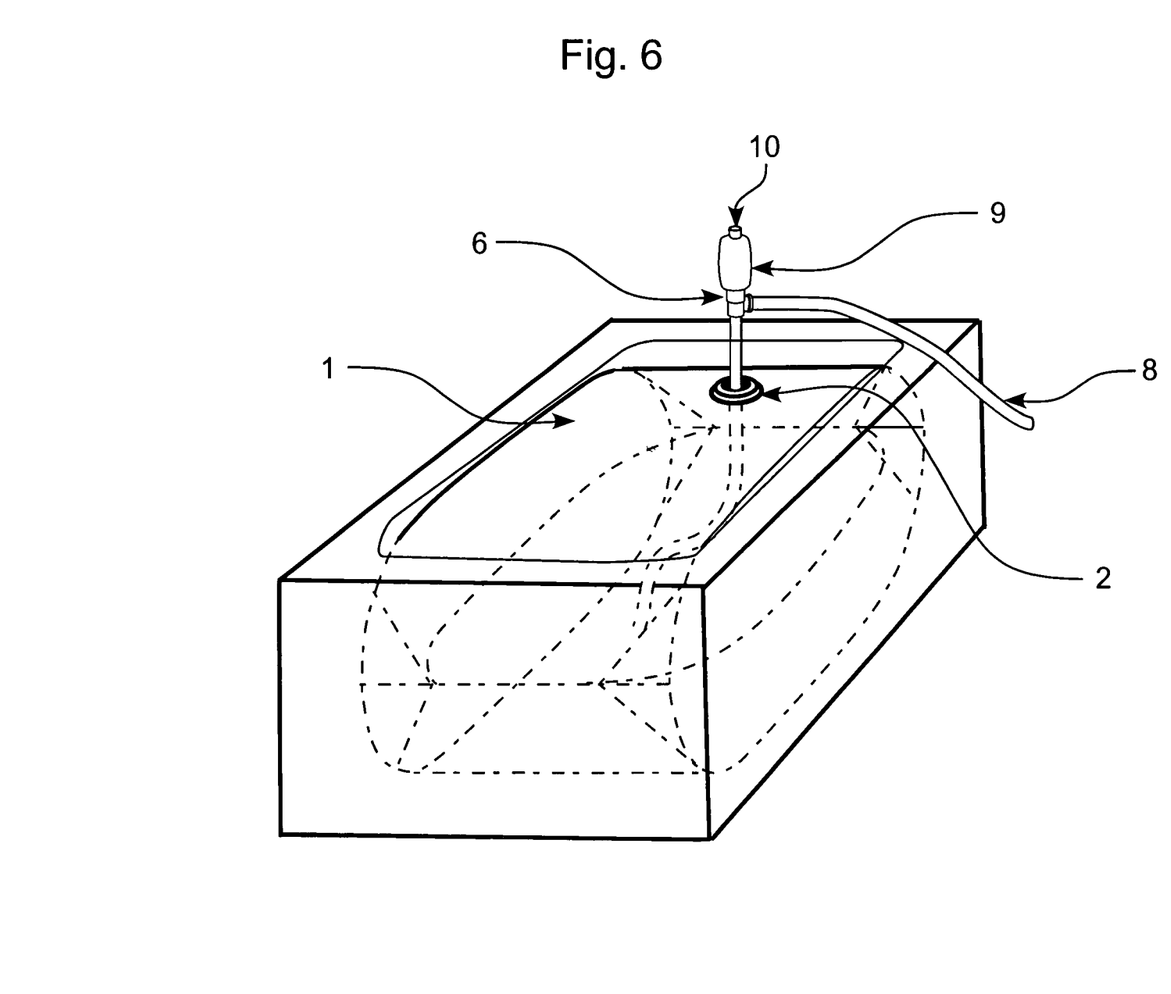
FIG. 6 provides a schematic diagram of a bathtub containing one embodiment of bladder liner 1 of the present invention, with a siphon pump assembly 6 configured for dispensing.

In some particularly preferred embodiments, the dispenser further comprises a fitting, such as a collar 11, configured to reversibly attach and seal the dispenser to an aperture of the bladder liner. In some embodiments the collar 11 is configured to attach to an aperture through which the bladder liner is filled. FIG. 6 provides a schematic diagram of a siphon pump assembly 6 positioned in the single aperture 2 of the bladder liner 1.

Figure 7:
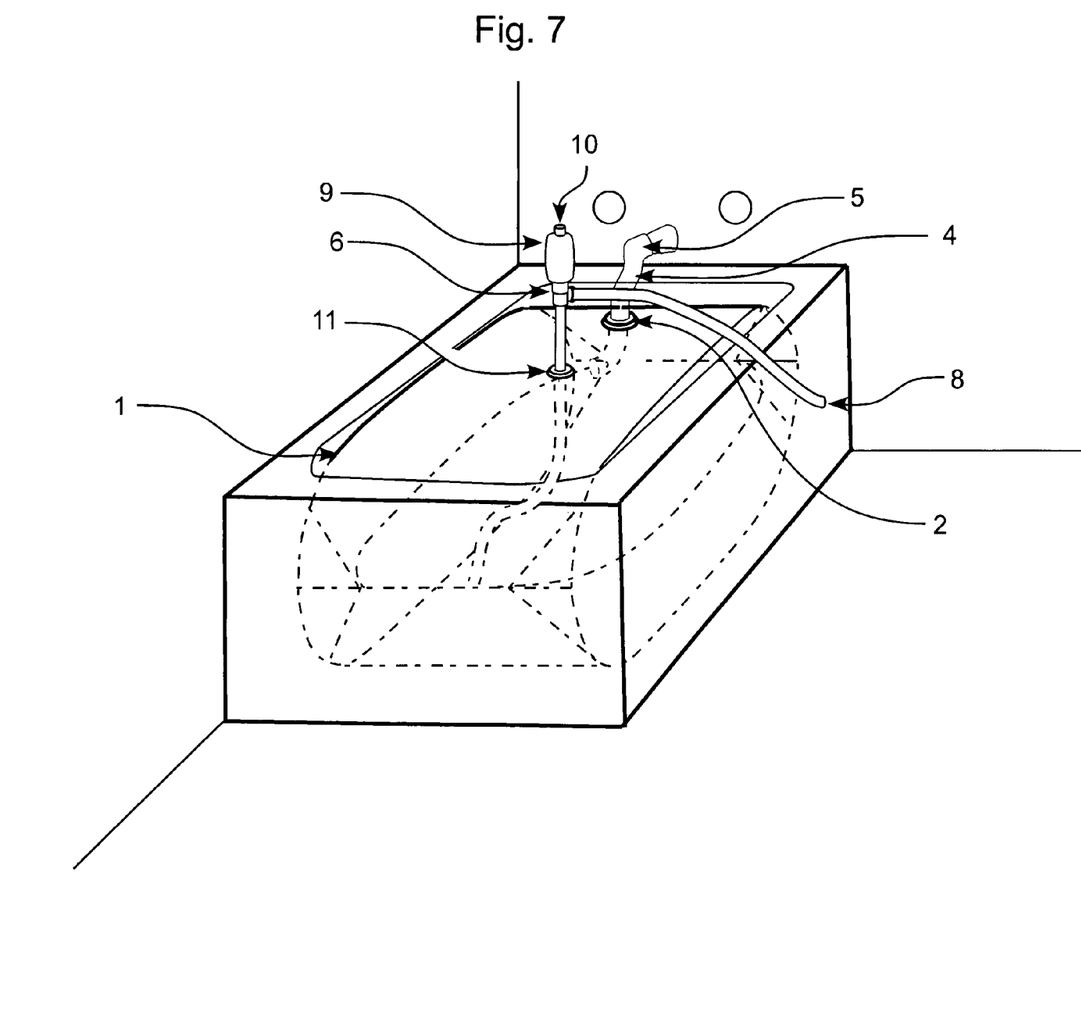
FIG. 7 provides a schematic diagram of a bathtub containing one embodiment of bladder liner 1 of the present invention, with filling hose 4 comprising a universal adaptor 5 configured for filling the bladder liner 1, and a siphon pump assembly 6 configured for dispensing.

In preferred embodiments, the collar 11 (or a another fitting configured for the same purpose) is configured to attach to a different aperture, such that the filling hose 4 and the siphon pump assembly 5 attach to separate apertures. FIG. 7 provides a schematic diagram of a bladder liner having two apertures 2, such that one can be used with a siphon pump assembly 6, while the other is used by filling hose 4. In some embodiments one or both of the siphon pump assembly 6 and the filling hose 4 are attached to bladder liner 1 at an aperture 2. In preferred embodiments, these attachments are reversible attachments.

In some embodiments, the system of the present invention comprises a filter, e.g., for water purification. Filters for water purification are known and are used, e.g., for camping, backpacking, etc. Filters include but are not limited to porous ceramic filters (e.g., Katadyn® filters by Katadyn Products, Inc, Wallisellen, Switzerland, WaterWorks® and SweetWater® systems by Mountain Safety Research, Seattle, Wash.). In some embodiments, the filter comprises a synthetic membrane microfilter, such as a SweetWater® 0.2-micron labyrinth depth filter. In preferred embodiments, the filter comprises an activated charcoal filter. In some embodiments, the intake hose 7 comprises a filter, while in some embodiments, the output tube comprises a filter. In some embodiments, the system of the present invention comprises a covering (e.g., a sheet or encasing bag to cover the bladder liner while in use) configured to reduce or alter transmission of light to water within the bladder liner, e.g., to reduce the growth of microbes such as algae. For example, in some embodiments, the covering is constructed of material that is opaque and/or dark in color (e.g., black, brown, dark blue, purple, etc.).

In some embodiments, a system of the present invention is provided in a kit. In some embodiments, a kit of the present invention comprises a cap for closing an aperture in a bladder liner. In some embodiments, a kit comprises a filter, e.g., for water purification. In some embodiments, a kit comprises a water treatment additive, such as a tablet or liquid. In some preferred embodiments, the water treatment additive is configured to decontaminate water, for example, the additive contains one or more antimicrobial or biocide agents, and/or chemical neutralizing agents (e.g., to adsorb, absorb, or otherwise reduce or alter the action of a chemical). In some embodiments, a water treatment additive comprises a flavoring agent. In preferred embodiments, the kit is a packaged kit.

All publications and patents mentioned in the above specification are herein incorporated by reference. Various modifications and variations of the described methods, components, and systems of the invention will be apparent to those skilled in the art without departing from the scope and spirit of the invention. Although the invention has been described in connection with specific preferred embodiments, it should be understood that the invention as claimed should not be unduly limited to such specific embodiments. Indeed, various modifications of the described modes for carrying out the invention which are obvious to those skilled in protein purification, engineering, or related fields are intended to be within the scope of the following claims.

I claim:

1. A system, comprising:
   a) a disposable food-grade bladder liner, wherein said food grade bladder liner is a liner for a bathtub configured to provide a barrier between the bathtub surface and liquid contained in the bathtub, wherein the body of said food grade bladder liner is composed of plastic film of about 1 to 20 mils in thickness, wherein said food-grade bladder liner has a storage volume of at least 50 gallons and is foldable, and wherein said food-grade bladder liner comprises at least one aperture, and
   b) a filling hose comprising a universal adaptor.

2. The system of claim 1, wherein said plastic film is about 2 to 10 mils in thickness.

3. The system of claim 1, wherein said plastic film is about 4 to 8 mils in thickness.

4. The system of claim 1, further comprising a dispenser.

5. The system of claim 4, wherein said dispenser comprises a pump.

6. The system of claim 4, wherein said dispenser comprises a siphon pump assembly.

7. The system of claim 4, wherein said dispenser comprises a collar for attachment of said dispenser to an aperture of said bladder liner.

8. The system of claim 1, further comprising a cap for reversibly sealing an aperture of said food-grade bladder liner.

9. A packaged kit comprising:
   a) a disposable food-grade bladder liner, wherein said food grade bladder liner is a liner for a bathtub configured to provide a barrier between the bathtub surface and liquid contained in the bathtub, wherein the body of said food grade bladder liner is composed of plastic film of about 1 to 20 mils in thickness, wherein said food-grade bladder liner has a storage volume of at least 50 gallons and is foldable, wherein said food-grade bladder liner comprises at least one aperture, and
   b) a filling hose comprising a universal adaptor.

10. The packaged kit of claim 9, wherein said plastic film is about 2 to 10 mils in thickness.

11. The packaged kit of claim 9, wherein said plastic film is about 4 to 8 mils in thickness.

12. The packaged kit of claim 9, further comprising a dispenser.

13. The packaged kit of claim 12, wherein said dispenser comprises a pump.

14. The packaged kit of claim 12, wherein said dispenser comprises a siphon pump assembly.

15. The packaged kit of claim 12, wherein said dispenser comprises a collar for attachment of said dispenser to an aperture of said bladder liner.

16. A method of collecting and dispensing potable water, comprising lining a bathtub with a disposable food-grade bladder liner, wherein said food grade bladder liner is a liner for a bathtub configured to provide a barrier between the bathtub surface and liquid contained in the bathtub, wherein the body of said food grade bladder liner is composed of plastic film of about 1 to 20 mils in thickness, wherein said food-grade bladder liner has a storage volume of at least 50 gallons and is foldable, wherein said food-grade bladder liner comprises at least one aperture, and filling said food grade bladder liner with water.

17. The method of claim 16, wherein said food grade bladder liner has a storage volume of at least 75 gallons.

* * * * *